United States Patent
Monajemi et al.

(10) Patent No.: US 12,395,954 B2
(45) Date of Patent: Aug. 19, 2025

(54) COLLISION AVOIDANCE IN MULTI LINK DEVICE (MLD) MAKE BEFORE BREAK ROAMING (MBBR)

(71) Applicant: Cisco Technology, Inc., San Jose, CA (US)

(72) Inventors: Pooya Monajemi, Irvine, CA (US); Malcolm Muir Smith, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 424 days.

(21) Appl. No.: 17/815,061

(22) Filed: Jul. 26, 2022

(65) Prior Publication Data

US 2024/0040525 A1 Feb. 1, 2024

(51) Int. Cl.
*H04W 56/00* (2009.01)
*H04W 74/00* (2009.01)

(52) U.S. Cl.
CPC ..... *H04W 56/0025* (2013.01); *H04W 74/004* (2013.01); *H04W 74/006* (2013.01)

(58) Field of Classification Search
None
See application file for complete search history.

(56) References Cited

U.S. PATENT DOCUMENTS

| | | | | |
|---|---|---|---|---|
| 2005/0053037 A1* | 3/2005 | Ginzburg | .............. | H04W 24/00 370/333 |
| 2012/0178488 A1* | 7/2012 | Jonker | .............. | H04W 8/005 455/517 |
| 2019/0253967 A1* | 8/2019 | Xiao | .............. | H04W 28/0284 |
| 2020/0374802 A1* | 11/2020 | Chu | .............. | H04W 28/08 |
| 2020/0404549 A1* | 12/2020 | Verma | .............. | H04W 24/10 |
| 2021/0377856 A1 | 12/2021 | Chu et al. | | |
| 2022/0007417 A1 | 1/2022 | Xin et al. | | |
| 2022/0029736 A1 | 1/2022 | Chu et al. | | |
| 2022/0053560 A1 | 2/2022 | Xin et al. | | |
| 2022/0159571 A1* | 5/2022 | Zhou | .............. | H04W 76/15 |
| 2022/0272630 A1* | 8/2022 | Shafin | .............. | H04W 52/0219 |
| 2023/0023779 A1* | 1/2023 | Shafin | .............. | H04W 76/15 |
| 2023/0163808 A1* | 5/2023 | Lou | .............. | H04W 74/002 455/101 |
| 2023/0199641 A1* | 6/2023 | Naik | .............. | H04W 76/15 370/318 |
| 2023/0254739 A1* | 8/2023 | Kim | .............. | H04W 36/0061 370/331 |
| 2023/0319922 A1* | 10/2023 | Lu | .............. | H04W 76/15 370/328 |
| 2024/0007889 A1* | 1/2024 | Lopez | .............. | H04W 28/0958 |
| 2024/0276405 A1* | 8/2024 | Hirata | .............. | H04W 28/0278 |
| 2025/0106613 A1* | 3/2025 | Chu | .............. | H04W 76/15 |

FOREIGN PATENT DOCUMENTS

WO 2022032150 A1 2/2022

* cited by examiner

*Primary Examiner* — Lonnie V Sweet
(74) *Attorney, Agent, or Firm* — Merchant & Gould P.C.

(57) ABSTRACT

Collision avoidance in Multi Link Device (MLD) Make Before Break Roaming (MBBR) may be provided. It may be determined that a client device may comprise an MBBR client device. Next, a Request To Send (RTS) may be sent to the client device. In response to sending the RTS to the client device, a Clear To Send (CTS) may be received from the client device. In response to receiving the CTS, data may be sent to the client device.

12 Claims, 8 Drawing Sheets

COLLISION AVOIDANCE IN MULTI LINK DEVICE (MLD) MAKE BEFORE BREAK ROAMING (MBBR)

TECHNICAL FIELD

The present disclosure relates generally to collision avoidance in Multi Link Device (MLD) Make Before Break Roaming (MBBR).

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
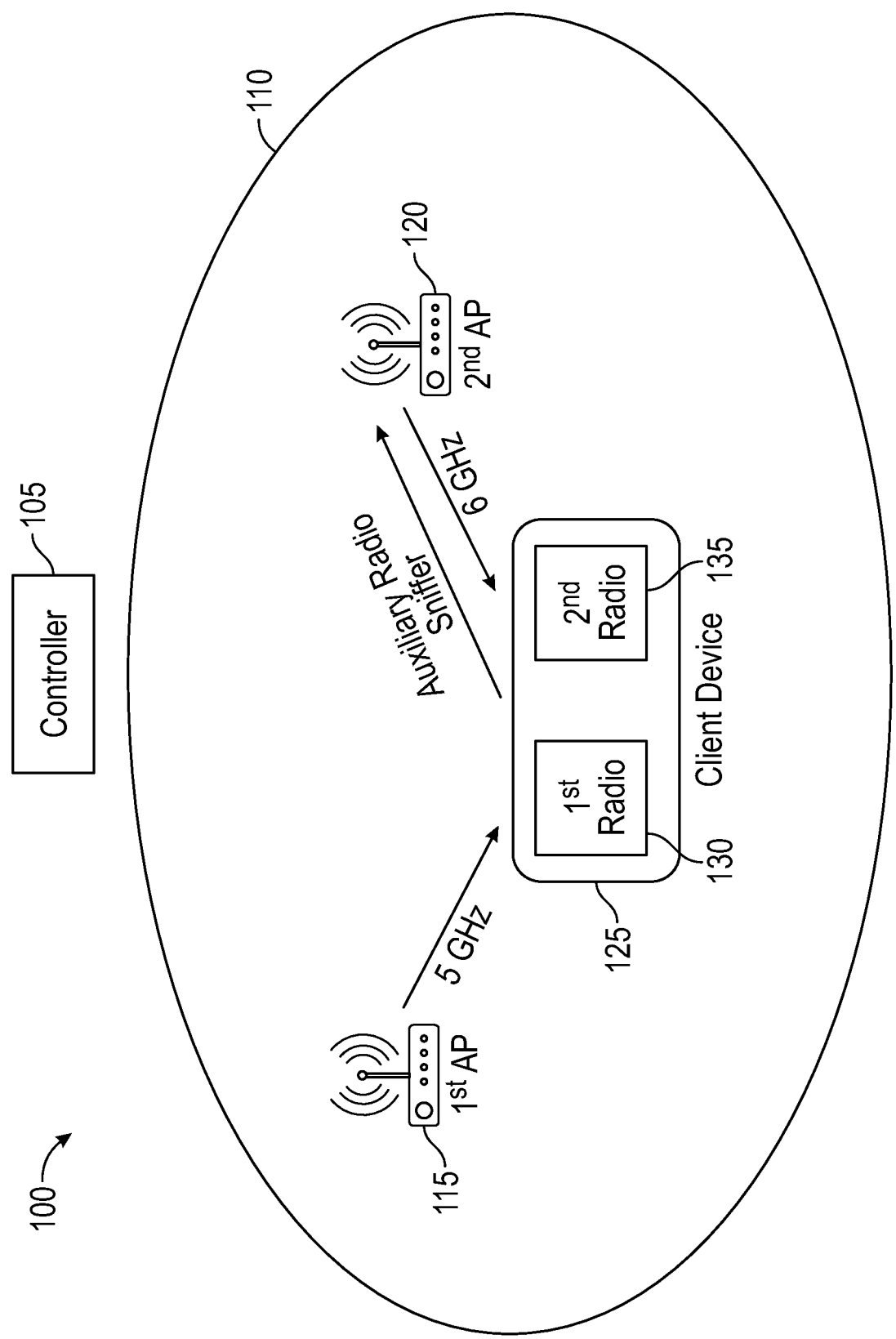
FIG. 1 is a block diagram of an operating environment for providing collision avoidance in Multi Link Device (MLD) Make Before Break Roaming (MBBR)

Collision avoidance in Multi Link Device (MLD) Make Before Break Roaming (MBBR) may be provided. It may be determined that a client device may comprise an MBBR client device. Next, a Request To Send (RTS) may be sent to the client device. In response to sending the RTS to the client device, a Clear To Send (CTS) may be received from the client device. In response to receiving the CTS, data may be sent to the client device. Embodiments of the disclosure may include other processes.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Make Before Break Roaming (MBBR) may comprise a moving client device initialing communication with a next Access Point (AP) while still being in contact with a current AP in order to not lose connectivity. In the Wi-Fi 7 Multi-Link Device (MLD) context, there may be three possible implementations of a station (i.e., client device): i) Simultaneous Transmit (TX)/Receive (RX) (STR) devices; ii) Non-STA (NSTR) devices; and iii) Enhanced Multi-Link Single Radio (eMLSR) devices.

STR devices may have two independent Transceivers (TXRX) capable of simultaneous and unrestricted operation on a given set of links (e.g., any channel in 2.4 GHz plus any channel in 5 GHz, 5 GHz plus 6 GHz, etc.). This mode may deliver significant instantaneous throughput gains and improved latency.

NSTR devices may contain two radios that may be constrained such that when one transmits, the other may not receive. This may place a restriction on the AP MLD to align its Presentation Protocol Data Unit (PPDU) transmissions across multiple links such that it may not require the Station (STA) (i.e., client device) to TX and RX at the same time (e.g., aligning the end of the Downlink (DL) PPDUs from each AP-STA link such the STA may TX both acknowledgements (ACKs) simultaneously, but may not need to RX any PPDUs during that time). This mode may also deliver significant instantaneous throughput gains and improved latency, but only when PPDUs may be aligned in the respective direction.

An eMLSR device may comprise a client device that may contain one TXRX capable of sending and receiving data frames on one channel/link and one simplified receiver on another link. Then the AP may select the link on which the client device is expected to receive a PPDU via an initial control frame (e.g., Multi User Request to Send MU-RTS) that the client device may concurrently listen for on two links allowing it to switch its single TXRX to the appropriate link for PPDU decoding and ACK generation. In this way, the client device may have better latency due to link diversity, but it may not use two links for improved instantaneous throughput.

An MLD device that may be operating in an MBBR mode may maintain a 5 GHz link with one AP and a 6 GHz link with another physical AP separated by a Local Area Network (LAN). For client devices, this mode may be simple to achieve because the links in a client device may be independent and may easily be hosted on distinct physical (i.e., non-co-located) APs. However TX/RX dependencies between links required by eMLSR and NTSR, especially those that change with each Transmit Opportunity (TXOP), may be difficult to manage in an MBBR mode. Embodiments of the disclosure may address these synchronization issues for the above types of constrained devices. In other words, embodiments of the disclosure may avoid eMLSR and NSTR MLD PPDU constraint conflicts (i.e., collisions) during an MBBR event (i.e., while the client device has one link connected to one AP and another link connected to another non-co-located AP).

FIG. 1 shows an operating environment 100 for providing collision avoidance in Multi Link Device (MLD) Make Before Break Roaming (MBBR). As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN for client devices). The plurality of APs may comprise a first AP 115 and a second AP 120. The plurality of APs may provide wireless network access to a client device 125 as it moves within coverage environment 110. Client device 125 may comprise, but is not limited to, a smart phone, a personal computer, a tablet device, a mobile device, a telephone, a remote control device, a set-top box, a digital video recorder, an Internet-of-Things (IoT) device, a network computer, a router, a Virtual Reality (VR)/Augmented Reality (AR) device, an Automated Transfer Vehicle (ATV), a drone, an Unmanned Aerial Vehicle (UAV), or other similar microcomputer-based device. Each of the plurality of APs may be compatible with specification standards such as, but not limited to, the Institute of Electrical and Electronics Engineers (IEEE) 802.11be specification standard for example.

Controller 105 may comprise a Wireless Local Area Network controller (WLC) and may provision and control coverage environment 110 (e.g., a WLAN). Controller 105 may allow client device 125 to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide collision avoidance in MLD MBBR.

First AP 115, second AP 120, and client device 125 may comprise Multi Link Devices (MLDs). For example, client device 125 may be simultaneously connected to first AP 115 via a first radio 130 (e.g., over a 5 GHz link) and to first AP 115 via a second radio 135 (e.g., over a 6 GHz link). As client device 125 roams within coverage environment 110, the second radio 135 link between client device 125 and first AP 115 may be broken and then the second radio 135 link between client device 125 and second AP 120 may be made. Accordingly, client device 125 may be simultaneously connected to first AP 115 via first radio 130 (e.g., over a 5 GHz link) and to second AP 120 via second radio 135 (e.g., over a 6 GHz link). First AP 115, second AP 120, or both first AP 115 and second AP 120 also include an auxiliary radio that, for example, may be used to sniff packets from other APs.

The elements described above of operating environment 100 (e.g., controller 105, first AP 115, second AP 120, or client device 125) may be practiced in hardware and/or in software (including firmware, resident software, microcode, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 8, the elements of operating environment 100 may be practiced in a computing device 800.

With embodiments of the disclosure, a client device that performs an MBBR roam may be detected either by explicit signaling by the client device or by a network (e.g., network controller) noticing concurrent associations on neighboring APs. The appropriate collision avoidance process may then be selected at a network level based on the network's knowledge of the client device's capability and constraints (e.g., STR or NSTR) on the links that may be involved in the roam.

Embodiments of the disclosure may include asynchronous and synchronous processes. The asynchronous processes may include: i) Downlink (DL) Request To Send (RTS) Protection; ii) Uplink (UL) Multi User (MU) Disablement; iii) Non-overlapping Target Wake Times (TWT) Setup; and iv) Auxiliary Radio Assistance. The asynchronous processes may avoid simultaneous TX/RX operation across a set of APs in MBBR mode for client device 125 without requiring any per-TXOP coordination between the APs themselves (i.e., all that may be required is the exchange of MBBR state). This approach may address both NSTR and eMLSR and may achieve a better outcome of higher reliability and seamless handover with MBBR, which may only be active in a cell overlap region and may not be a permanent state.

Downlink (DL) Request to Send (RTS) Protection

Figure 2:
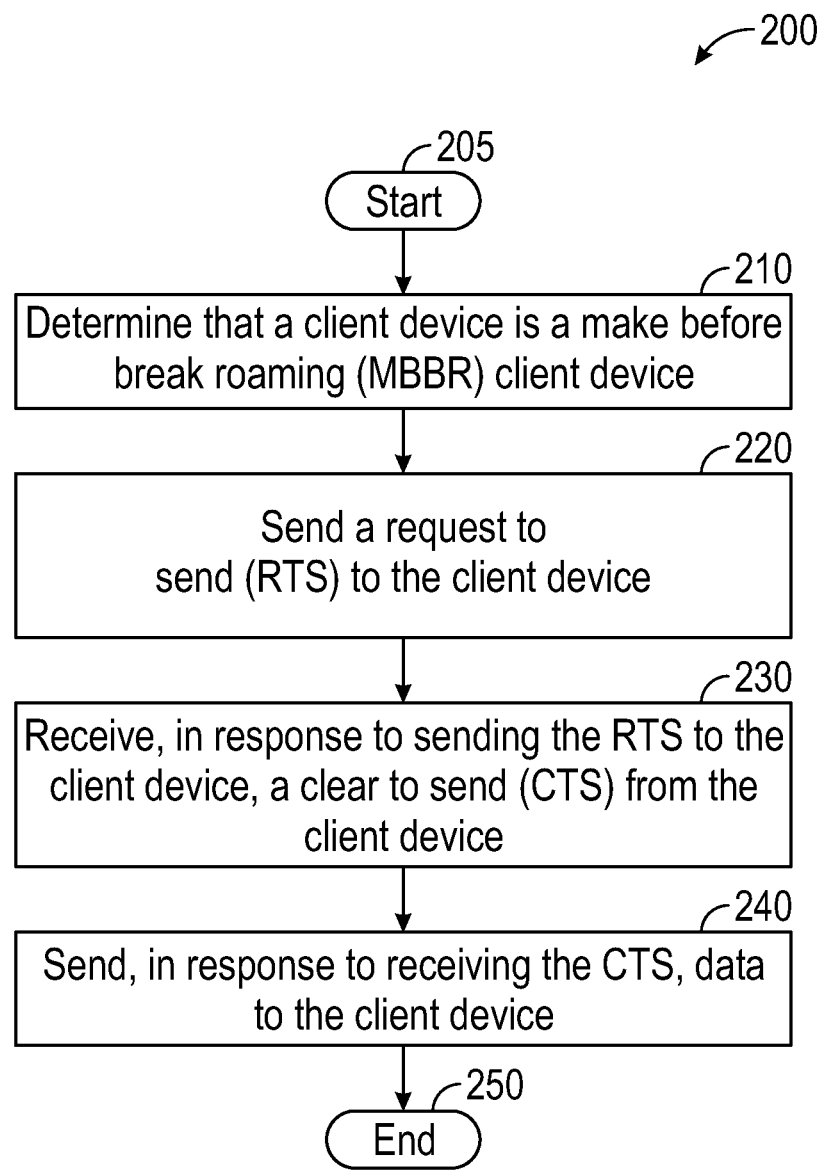
FIG. 2 is a flow chart of a method for providing collision avoidance in MLD MBBR.

FIG. 2 is a flow chart setting forth the general stages involved in a method 200 consistent with embodiments of the disclosure for providing collision avoidance in MLD MBBR. Method 200 may be implemented using a computing device 800 as described in more detail below with respect to FIG. 8. Ways to implement the stages of method 200 will be described in greater detail below.

Method 200 may begin at starting block 205 and proceed to stage 210 where computing device 800 may determine that client device 125 is an MBBR client device. For example, client device 125 may comprises an NSTR device or an eMLSR device.

From stage 210, where computing device 800 determines that client device 125 is an MBBR client device with NSTR or eMLSR constraint, method 200 may advance to stage 220 where computing device 800 may send, prior to each TXOP involving the MBBR client, a Request To Send (RTS) to client device 125. For example, when an MBBR client device is detected, all downlink frames may then be protected by RTS.

Once computing device 800 sends, in response to determining that client device 125 is an MBBR client device, the RTS to client device 125 in stage 220, method 200 may continue to stage 230 where computing device 800 may receive, in response to sending the RTS to the client device, a Clear To Send (CTS) from client device 125. For example, reception of the CTS from client device 125 may ensure that the constrained client device (e.g., client device 125) may not be busy on an alternate link with a neighboring AP.

After computing device 800 receives, in response to sending the RTS to the client device, the CTS from client device 125 in stage 230, method 200 may proceed to stage 240 where computing device 800 may send, in response to receiving the CTS, data to client device 125. Once computing device 800 sends, in response to receiving the CTS, data to client device 125 in stage 240, method 200 may then end at stage 250.

Uplink (UL) Multi User (MU) Disablement

Figure 3:
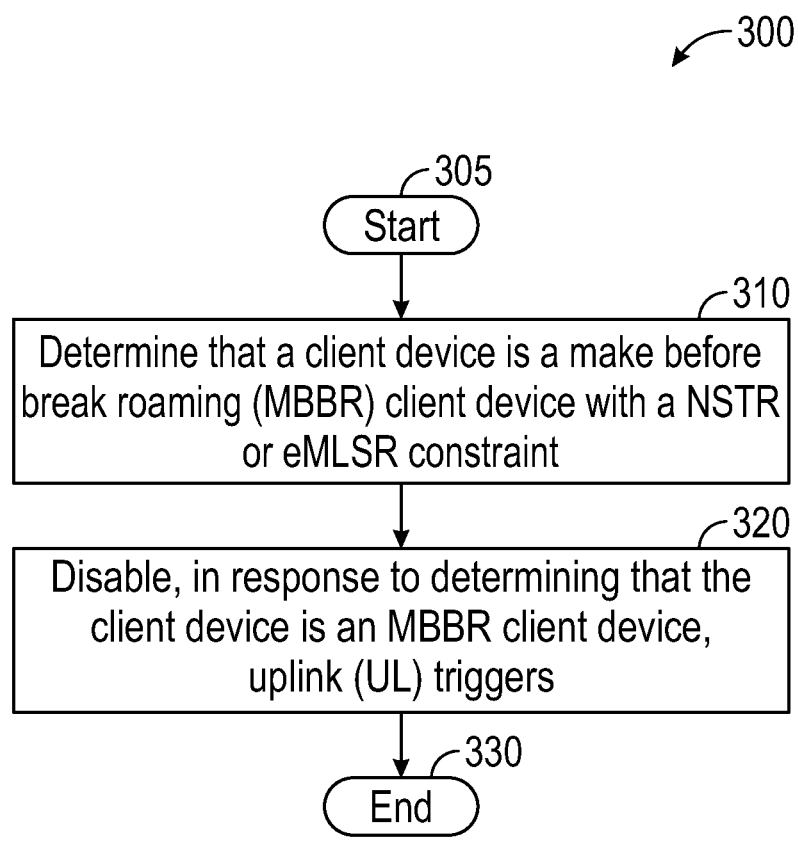
FIG. 3 is a flow chart of a method for providing collision avoidance in MLD MBBR.

FIG. 3 is a flow chart setting forth the general stages involved in a method 300 consistent with embodiments of the disclosure for providing collision avoidance in MLD MBBR. Method 300 may be implemented using a computing device 800 as described in more detail below with respect to FIG. 8. Ways to implement the stages of method 300 will be described in greater detail below.

Method 300 may begin at starting block 305 and proceed to stage 310 where computing device 800 may determine that client device 125 is an MBBR client device. For example, client device 125 may comprises an NSTR device or an eMLSR device.

From stage 310, where computing device 800 determines that client device 125 is an MBBR client device, with a NSTR or eMLSR constraint method 300 may advance to stage 320 where computing device 800 may disable, in response to determining that client device 125 is an MBBR client device, Uplink (UL) triggers. For example, UL triggers may be disabled during an MBBR roam (i.e., equivalent to UL MU opt out). This may be because a triggering AP may not know about the state of the client device on another link, and a client device that gets triggered may not be able to send a trigger response due to constraints from the other link for example. Once computing device 800 allows client device 125 to choose the link for UL TXOPs in stage 330, method 300 may then end at stage 340.

Non-Overlapping Target Wake Times (TWT) Setup

Figure 4:
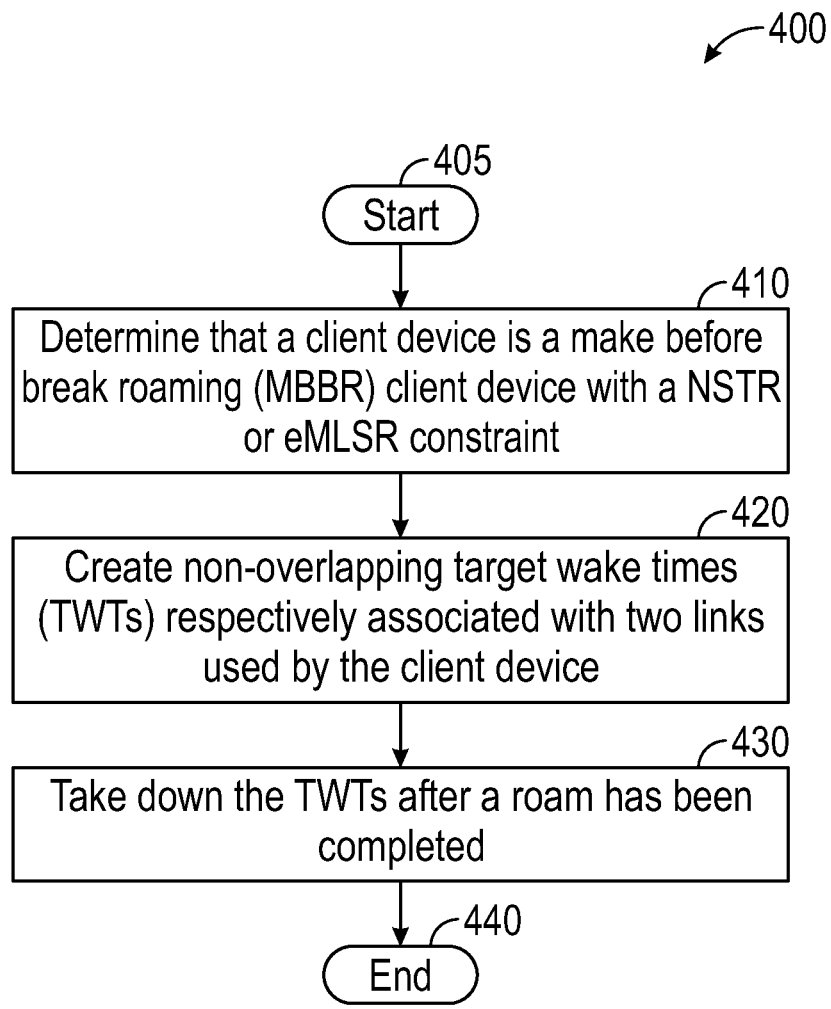
FIG. 4 is a flow chart of a method for providing collision avoidance in MLD MBBR.

FIG. 4 is a flow chart setting forth the general stages involved in a method 400 consistent with embodiments of the disclosure for providing collision avoidance in MLD MBBR. Method 400 may be implemented using a computing device 800 as described in more detail below with respect to FIG. 8. Ways to implement the stages of method 400 will be described in greater detail below.

Method 400 may begin at starting block 405 and proceed to stage 410 where computing device 800 may determine that client device 125 is an MBBR client device. For example, client device 125 may comprises an NSTR device or an eMLSR device.

From stage 410, where computing device 800 determines that client device 125 is an MBBR client device with a NSTR or eMLSR constraint, method 400 may advance to stage 420 where computing device 800 may create non-overlapping Target Wake Times (TVVTs) respectively associated with two links used by client device 125. For example, TWT negotiations with non-overlapping windows may be set for each link involved in a roam as soon as the MBBR mode is active. The coordination of the TWT windows may be performed by client device 125 to suggest TWT times such that overlap may not occur between the links. They may also be coordinated by the network (e.g., controller 105), taking into account Target Beacon Transmission Time (TBTT) offsets between the links involved in the roam. The TWT approach may be applicable to a single radio client also. In some embodiments of the disclosure, a client device (e.g., client device 125) may create the non-overlapping Target Wake Times (TVVTs) rather than computing device 800.

Once computing device 800 creates non-overlapping TVVTs respectively associated with two links used by client device 125 in stage 420, method 400 may continue to stage 430 where computing device 800 may take down the TWTs after a roam has been completed. For example, the TWT agreements may be torn down once the roam is complete. Because the TWT may not be used for power saving purpose, the awake-window duty cycle may be set close to 50% for example. Once computing device 800 takes down the TVVTs after the roam has been completed in stage 430, method 400 may then end at stage 440.

Auxiliary Radio Assistance

Figure 5:
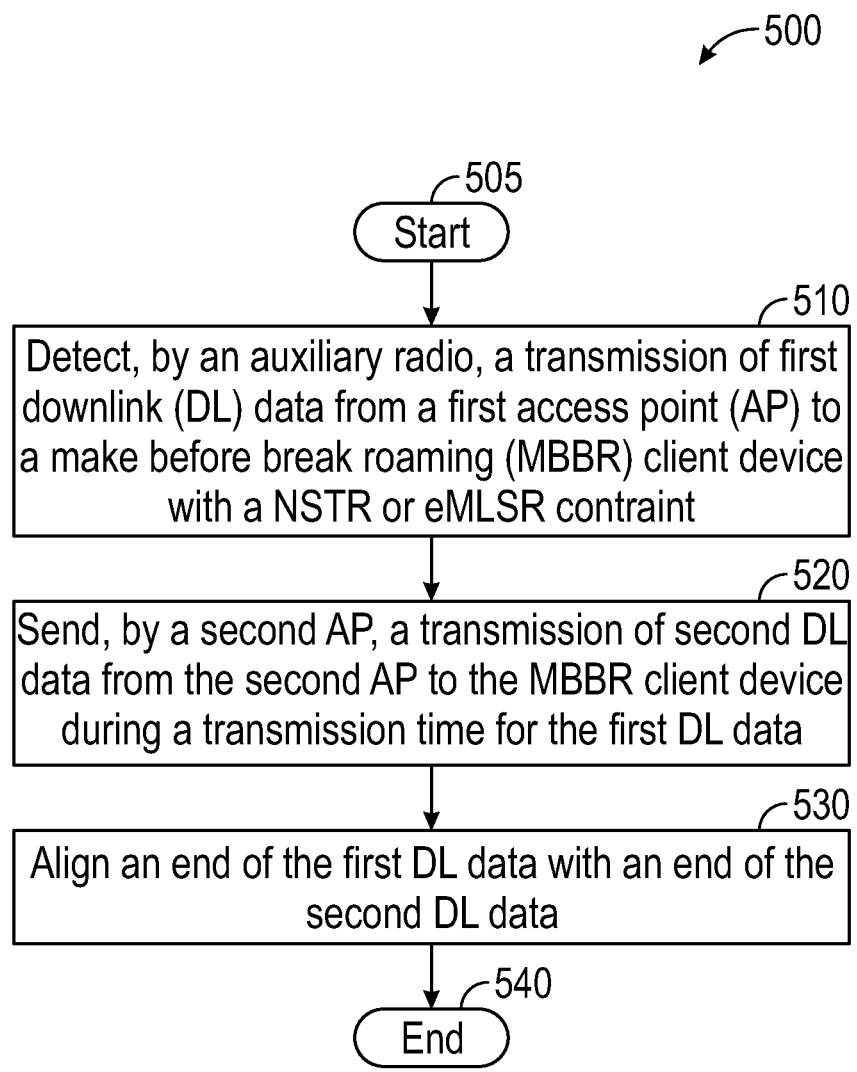
FIG. 5 is a flow chart of a method for providing collision avoidance in MLD MBBR.

FIG. 5 is a flow chart setting forth the general stages involved in a method 500 consistent with embodiments of the disclosure for providing collision avoidance in MLD MBBR. Method 500 may be implemented using a computing device 800 as described in more detail below with respect to FIG. 8. Ways to implement the stages of method 500 will be described in greater detail below.

Figure 7:
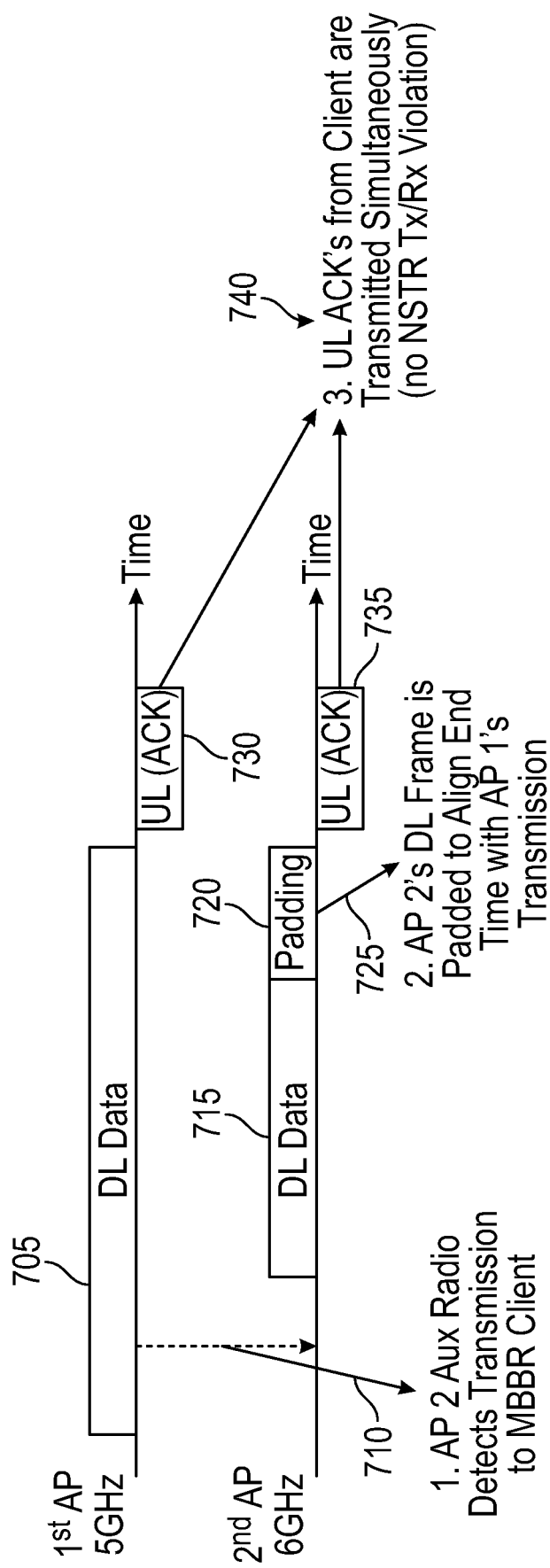
FIG. 7 illustrates using auxiliary radio assistance for providing collision avoidance in MLD MBBR.

Method 500 may begin at starting block 505 and proceed to stage 510 where computing device 800 (e.g., disposed in second AP 120) may detect, by an auxiliary radio (e.g., disposed in second AP 120), a transmission of first Downlink (DL) data 705 from first AP 115 to an MBBR client device (e.g., client device 125) as illustrated in FIG. 7. For example, an auxiliary RX-only radio on second AP 120 may be assigned to first AP 115's 5 GHz channel during a roam (and vice versa). Both UL and DL transmissions from client device 125 may be detected and reported to second AP 120's 6 GHz radio. Second AP 120's auxiliary radio may detect transmission of first DL data 705 to client device 125 (state 710).

From stage 510, where computing device 800 detects, by the auxiliary radio, the transmission of first DL data 705 from first AP 115 to an MBBR client device with a NSTR constraint, method 500 may advance to stage 520 where computing device 800 (e.g., disposed in second AP 120) may initiate a transmission of second DL data 715 from second AP 120 to the MBBR client device (e.g., client device 125) during a transmission time for first DL data 705. For example, TXOP collisions may be avoided when second AP 120's auxiliary radio detects a TXOP involving a roaming client (i.e., client device 125) on the neighboring AP (i.e., first AP 115). Embodiments of the disclosure may either avoid TXOP collision and not transmit during the detected TXOP on a neighbor AP (could be done for both eMLSR clients and NSTR clients) or embodiments of the disclosure may transmit and align the end times as described below (only for NSTR clients).

Once computing device 800 sends the transmission of second DL data 715 from second AP 120 to the MBBR client device (e.g., client device 125) during the transmission time for first DL data 705 in stage 520, method 500 may continue to stage 530 where computing device 800 (e.g., disposed in second AP 120) may align an end of first DL data 705 with an end of second DL data 715. For example, for the PPDU end-time alignment for NSTR devices, when a DL PPDU for the roaming client is detected by the auxiliary radio on the neighboring AP, any locally transmitted DL PPDUs may also be aligned with the detected PPDU's end time. Padding 720 may be added to second AP 120's second DL data 715 to align it to the end time of first AP 115's first DL data 705 (state 725). A first UL acknowledgement 730 associated with the reception of first DL data 705 and a second UL acknowledgement 735 associated with the reception of the second DL data 715 may be transmitted substantially simultaneously to first AP 115 and second AP 120 respectively (state 740). Once computing device 800 aligns the end of first DL data 705 with the end of second DL data 715 in stage 530, method 500 may then end at stage 540.

Synchronous

Figure 6:
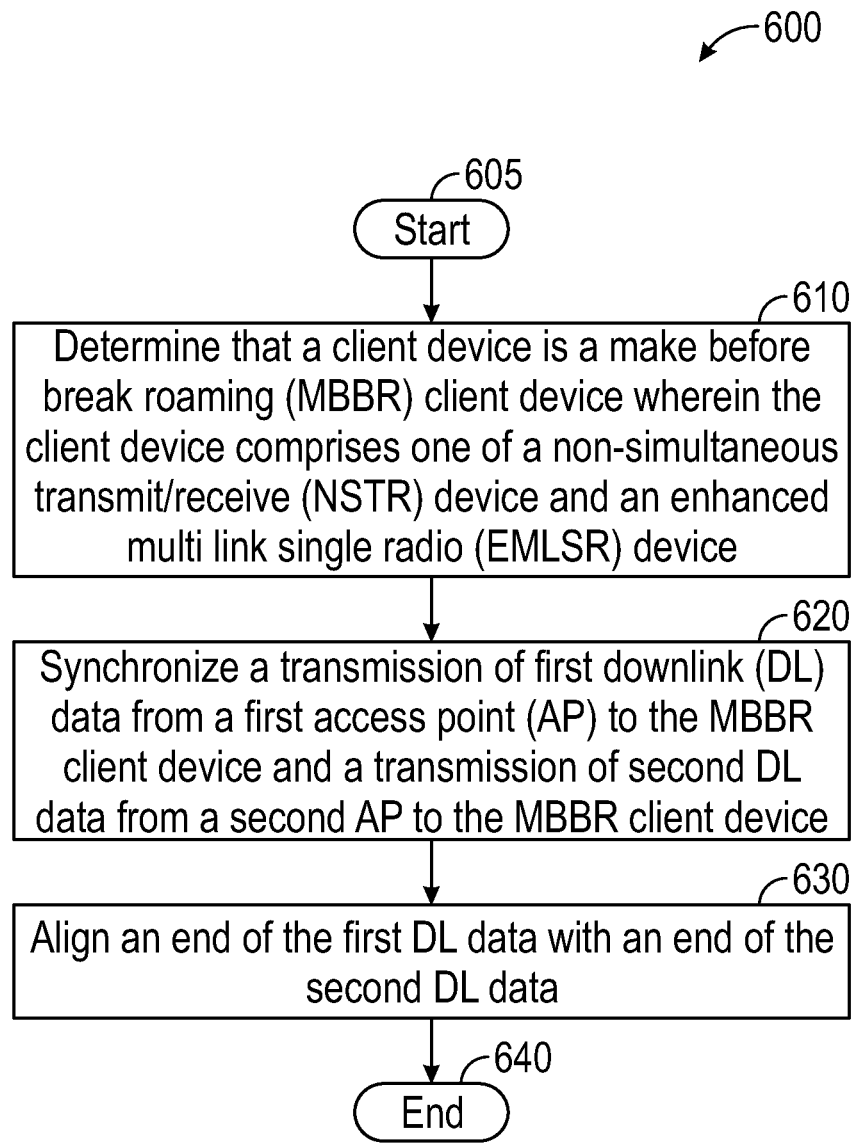
FIG. 6 is a flow chart of a method for providing collision avoidance in MLD MBBR.

FIG. 6 is a flow chart setting forth the general stages involved in a method 600 consistent with embodiments of the disclosure for providing collision avoidance in MLD MBBR. Method 600 may be implemented using a computing device 800 as described in more detail below with respect to FIG. 8. Ways to implement the stages of method 600 will be described in greater detail below.

Method 600 may begin at starting block 605 and proceed to stage 610 where computing device 800 (e.g., disposed in controller 105) may determine that client device 125 is an MBBR client device. For example, client device 125 may comprises an NSTR device or an eMLSR device.

From stage 610, where computing device 800 determines that client device 125 is an MBBR client device, method 600 may advance to stage 620 where computing device 800 (e.g., disposed in controller 105) may synchronize a transmission of first Downlink (DL) data from first AP 115 to client device 125 and a transmission of second DL data from second AP 120 to client device 125. For example, embodiments of the disclosure may avoid colliding DL schedules for the same eMLSR client (e.g., client device 125) or ensure PPDU end-time alignment for the same NSTR client (e.g., client device 125) by specifying accurate PPDU transmission times to each MBBR AP (e.g., first AP 115 and second AP 120).

Once computing device 800 synchronizes the transmission of first DL data from first AP 115 to client device 125 and the transmission of the second DL data from second AP 120 to client device 125 in stage 620, method 600 may continue to stage 630 where computing device 800 may align an end of the first DL data with an end of the second DL data. For example, specifying an accurate PPDU transmission times may cause the ends to be aligned.

The synchronous process may work well for APs predominantly in Basic Service Set (BSS) scheduled access mode (e.g., Wi-Fi 6E) or inter-BSS scheduled access mode (e.g., Wi-Fi7) because: i) there may be few unexpected TXOPs; and ii) with Wi-Fi7, the WLC may have the AP's future schedule. The WLC may schedule a slightly future time considering the message transport transit time.

In addition, the synchronous process may emulate per-TXOP synchronization, but may avoid direct per-TXOP synchronization between neighboring MBBR APs themselves. This approach may leverage Wireless Time Sensitive Networking (WTSN) capabilities (e.g., based on 802.1AS and 802.1Qbv time-aware-scheduling) that may provide, for example, approximately 1 us time sync and PPDU transmission alignment between neighboring APs (e.g., among different bands/channels). Once computing device 800 aligns the end of the first DL data with the end of the second DL data in stage 630, method 600 may then end at stage 640.

Figure 8:
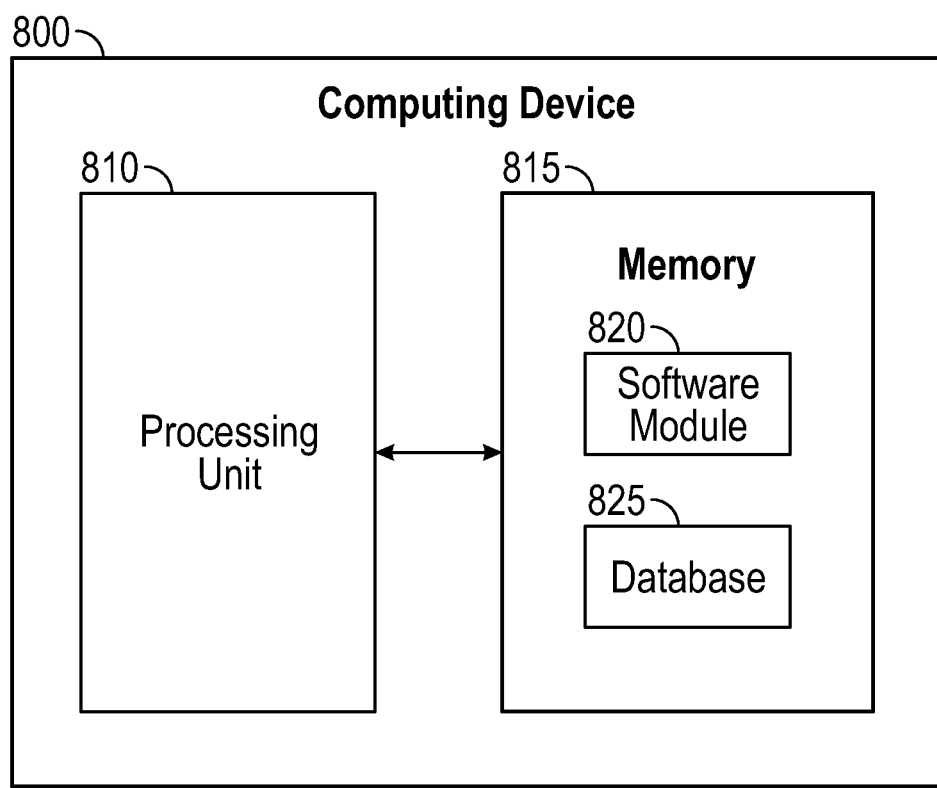
FIG. 8 is a block diagram of a computing device.

FIG. 8 shows computing device 800. As shown in FIG. 8, computing device 800 may include a processing unit 810 and a memory unit 815. Memory unit 815 may include a software module 820 and a database 825. While executing on processing unit 810, software module 820 may perform, for example, processes for providing collision avoidance in MLD MBBR as described above with respect to FIG. 2, FIG. 3, FIG. 4, FIG. 5, and FIG. 6. Computing device 800, for example, may provide an operating environment for controller 105, first AP 115, second AP 120, or client device 125. Controller 105, first AP 115, second AP 120, or client device 125 may operate in other environments and are not limited to computing device 800.

Computing device 800 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, network relay devices, or other similar microcomputer-based device. Computing device 800 may comprise any computer operating environment, such as hand-held devices, multiprocessor systems, microprocessor-based or programmable sender electronic devices, minicomputers, mainframe computers, and the like. Computing device 800 may also be practiced in distributed computing environments where tasks are performed by remote processing devices. The aforementioned systems and devices are examples and computing device 800 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 800 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   determining a Make Before Break Roaming (MBBR) action from a client device, wherein the client device is a multi-link device comprising a first link established with a first Access Point (AP) and a second link established with a second AP, and wherein the first AP and the second AP are non-co-located APs, and wherein the client device is with one of a Non-Simultaneous Transmit/Receive (NSTR) and an Enhanced Multi Link Single Radio (eMLSR);
   creating non-overlapping Target Wake Times (TWTs) respectively associated with two links used by the client device; and
   taking down the TWTs after a roam has been completed.

2. The method of claim 1, wherein an awake-window duty cycle for each of the TWTs is less than 50%.

3. The method of claim 1, wherein creating the non-overlapping TWTs comprises creating the non-overlapping TWTs by the client device.

4. The method of claim 1, wherein creating the non-overlapping TWTs comprises creating the non-overlapping TWTs by a controller of a network.

5. A system comprising:
   a memory storage; and
   a processing unit coupled to the memory storage, wherein the processing unit is operative to:
      determine a Make Before Break Roaming (MBBR) action from a client device, wherein the client device is a multi-link device comprising a first link established with a first Access Point (AP) and a second link established with a second AP, and wherein the first AP and the second AP are non-co-located APs, and wherein the client device is one of a Non-Simultaneous Transmit/Receive (NSTR) and an Enhanced Multi Link Single Radio (eMLSR);
      create non-overlapping Target Wake Times (TWTs) respectively associated with two links used by the client device; and
      take down the TWTs after a roam has been completed.

6. The system of claim 5, wherein an awake-window duty cycle for each of the TWTs is less than 50%.

7. The system of claim 5, wherein the processing unit being operative to create the non-overlapping TWTs comprises the processing unit being operative to create the non-overlapping TWTs by the client device.

8. The system of claim 5, wherein the processing unit being operative to create the non-overlapping TWTs comprises the processing unit being operative to create the non-overlapping TWTs by a controller of a network.

9. A non-transitory computer-readable medium that stores a set of instructions which when executed by a processor perform a method executed by the set of instructions comprising:
   determining a Make Before Break Roaming (MBBR) action from a client device, wherein the client device is a multi-link device comprising a first link established with a first Access Point (AP) and a second link established with a second AP, and wherein the first AP and the second AP are non-co-located APs, and wherein the client device is one of a Non-Simultaneous Transmit/Receive (NSTR) and an Enhanced Multi Link Single Radio (eMLSR);
   creating non-overlapping Target Wake Times (TWTs) respectively associated with two links used by the client device; and
   taking down the TWTs after a roam has been completed.

10. The non-transitory computer-readable medium of claim 9, wherein an awake-window duty cycle for each of the TWTs is less than 50%.

11. The non-transitory computer-readable medium of claim 9, wherein creating the non-overlapping TWTs comprises creating the non-overlapping TWTs by the client device.

12. The non-transitory computer-readable medium of claim 9, wherein creating the non-overlapping TWTs comprises creating the non-overlapping TWTs by a controller of a network.

* * * * *